3,637,838
PROCESS FOR THE PREPARATION OF
D,L-LYSINE
Marvin T. Tetenbaum and Edward R. Degginger, Convent, N.J., assignors to Allied Chemical Corporation, New York, N.Y.
No Drawing. Filed Apr. 2, 1969, Ser. No. 812,864
Int. Cl. C07c 99/00, 101/24
U.S. Cl. 260—534 L                           1 Claim

ABSTRACT OF THE DISCLOSURE

Trans-diethyl-4-chloro-2-butenyl-acetamidomalonate, a new composition of matter, readily undergoes ammination in liquid ammonia to form diethyl-4-amino-2-butenyl-acetamidomalonate which can be transformed by known methods into lysine, a valuable dietary supplement. The trans-diethyl-4-chloro - 2 - butenyl-acetamidomalonate is formed by reaction of trans 1,4-dichloro-butene-2 with the alkali metal salt of diethyl acetamidomalonate.

BACKGROUND OF THE INVENTION

The fact that a large proportion of the world's population suffers from a dietary defficiency is well known.

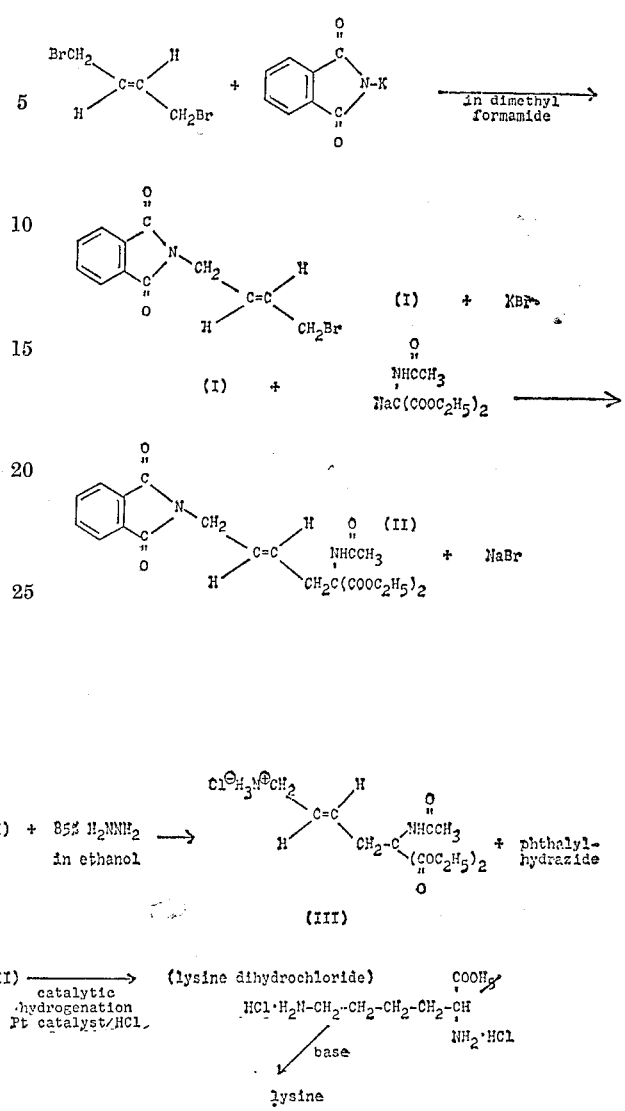

Much effort has been expended on discovering synthetic routes to one or more of the nutritionally essential amino acids such as lysine. This invention relates to a novel process for the production of lysine and more particularly to a novel compound which can be readily transformed into lysine by simple chemical reactions.

DESCRIPTION OF THE PRIOR ART

A synthetic process for the production of lysine has recently been described (Ber. 93, 2282 [1960]) which required numerous steps:

It is obvious that the above-indicated synthetic route to lysine involves too many steps and expensive reagents to be economically feasible.

SUMMARY OF THE INVENTION

It is an object of this invention to provide a new synthetic route to lysine.

It is a further object of this invention to provide a facile synthetic route to lysine which utilizes readily available starting materials.

Further objects and advantages will become apparent from the description of the invention which follows in greater detail.

It has now been found in accordance with this invention that lysine may be readily prepared by the following route:

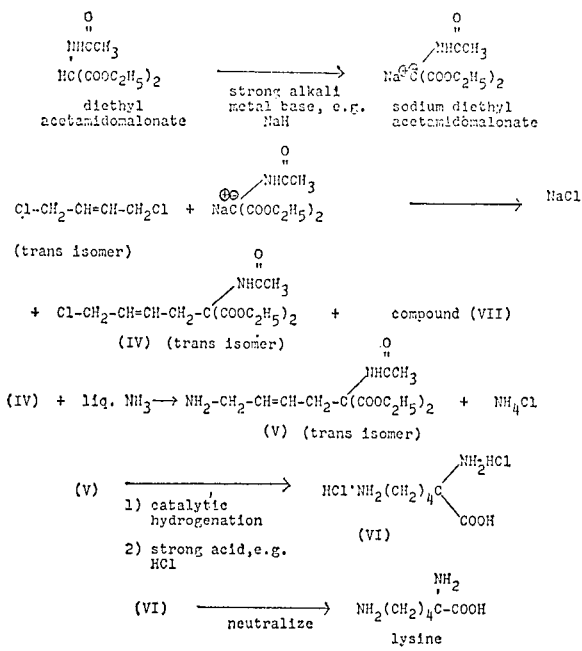

Compound IV is novel, and in addition to its utility as a lysine precursor, it can be free-radical copolymerized with other vinylic monomers to provide cross-linkable copolymers. Trans-1,4-dichloro-butene-2 and diethyl acetamidomalonate, the starting materials for the novel lysine synthesis of the instant invention, are both readily commercially available materials.

The alkali metal salt of diethyl acetamidomalonate is readily prepared by reacting diethyl acetamidomalonate with a strong alkali metal-containing base such as sodium, potassium or lithium metal, metal hydride, metal amide or sodium, potassium or lithium methoxide, ethoxide, isopropoxide, or t-butoxide. The alkali metal salt formation must be carried out under substantially anhydrous conditions and preferably under an inert gas atmosphere so as to positively exclude air which may contain water vapor. To avoid local overheating and for ease of handling of reactants, the alkali metal salt is preferably formed in an inert solvent.

Suitable inert solvents when the alkali metal alkoxides are being used are the alcohols corresponding to the alkoxides. When alkali metal hydride, amide or free metal is used, suitable solvents include benzene, toluene, xylene, cyclohexane, octane, tetrahydrofuran, diglyme, glyme, and diethyl carbitol.

The alkali metal salt formation occurs readily and is most conveniently carried out at room temperature, although higher or lower temperatures do not significantly affect the reaction. Reaction between the alkali metal salt and trans-1,4-dichlorobutene-2 can be effected by simply mixing the two reactants together without solvent at room temperature. Preferably, the alkali metal salt in inert solvent is added portionwise to the dichlorobutene and the mixture refluxed to ensure completeness of reaction.

Compound IV can be readily separated from the alkali metal chloride which forms conjointly therewith by decantation, filtration, or other known procedures.

The reaction of trans-1,4-dichlorobutene-2 with the alkali metal salt also affords as a minor side product the disubstitution product:

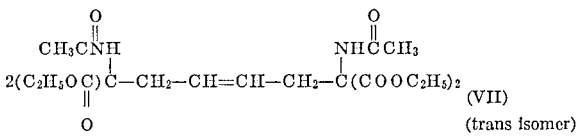

which is also a novel compound that can be saponified readily to the bis-amino acid which can then be copolymerized to form cross-linkable copolymers.

Compound IV is separated from Compound VII by distillation at reduced pressure. Compound VII remains behind as a nonvolatile residue.

Compound V is formed by simply dissolving Compound IV in at least an equimolar amount of liquid ammonia until replacement of —Cl by —NH$_2$ is complete. Preferably, an excess of ammonia is used which excess is allowed to evaporate from the reaction mixture leaving Compound V as a nonvolatile residue, together with the ammonium chloride that forms conjointly. Replacement is ordinarily complete after about 1 hour although longer reaction times may be necessary if an excess of ammonia is not used. Separation of Compound V from the ammonium chloride is effected most simply by solvent extraction using essentially any inert organic solvent in which the ammonium chloride is insoluble and Compound V is soluble. Suitable solvents include, for example, benzene, toluene, ether, hexane, heptane, methylene chloride, chloroform, and the like. Evaporation of the extraction solvent affords essentially pure Compound V.

Transformation of Compound V into lysine requires a reduction of the 2–3 carbon-carbon double bond, the deesterification of one of the two terminal —COOC$_2$H$_5$— groups to COOH, the removal of the other

—COOC$_2$H$_5$— group and the deamidation of the

group to —NH$_2$. This transformation is much less tedious than the above recitation would seem to indicate. The deamidation of the

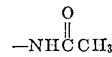

group and the deesterification of both —COOC$_2$H$_5$ groups to —COOH can, of course, be done simultaneously. Additionally, simple heating of the deesterified —COOC$_2$H$_5$ groups causes the desired loss of one of these two groups. It is thus apparent that only two steps are really involved: (1) reduction of the carbon-carbon double bond and (2) deesterification-deamidation with concomitant decarboxylation by heating to provide the —NH$_2$ and —COOH groups. The deesterification-deamidation can be either acidic or basic. The only proviso is that after such reaction the product must of course be neutralized to provide the free lysine. Either the deesterification-deamidation or the reduction of the double bond may be carried out first. We find the most convenient procedure involves a catalytic reduction of the double bond followed by deesterification-deamidation decarboxylation by heating with strong acid.

The reduction with hydrogen and catalyst can be carried out using any of the standard procedures for the reduction of carbon-carbon double bonds. Suitable reduction catalysts include platinum oxide, palladium or platinum on carbon or other inert support, Raney nickel, and the like. Generally, the reduction is carried out by dissolving the Compound V in an inert solvent such as ethanol or benzene, placing the solution plus reduction catalyst in a pressure vessel, providing a hydrogen atmosphere, and heating the solution until hydrogen uptake has ceased.

The catalyst is separated by filtration or decantation and the solvent evaporated off, if desired.

We have found that the most preferred method of transforming Compound V into lysine entails dissolution of Compound V in a $C_1$ to $C_3$ alcohol, which solution, along with 1 to 10 weight percent of catalyst such as 3 to 10% palladium on charcoal or platinum oxide, is then placed in a pressure vessel and hydrogenated at 30° to 80° until hydrogen uptake ceases. The solution is then filtered to remove catalyst and a strong acid such as HCl, $H_2SO_4$ or $H_3PO_4$ added. Refluxing of the acidified solution results in deesterification and deamidation and affords an alcoholic solution of Compound VI. The solution is then neutralized, filtered to remove inorganic salt formed by the neutralization, and evaporated. Hydrochloric acid is the preferred acid, since it is volatile and entails no removal problems. The evaporation residue is lysine.

The invention can be more fully understood by reference to the following examples. All parts are parts by weight unless otherwise expressly noted.

EXAMPLE 1

Two parts of metallic sodium is dissolved in 100 parts of anhydrous ethanol while maintaining a nitrogen atmosphere over the ethanol. As soon as dissolution is complete, 19 parts of diethyl acetamidomalonate is added portionwise to the sodium ethoxide-in-ethanol solution. After addition is complete, the mixture is refluxed for one hour and then allowed to cool to room temperature. The thereby resulting ethanolic solution of sodium diethyl acetamidomalonate is added portionwise with agitation over a 1-hour period to 55 parts of trans-1,4-dichlorobutene preheated to a temperature of 50° C. After addition is complete, the mixture is refluxed for 8 hours, allowed to cool to room temperature and the sodium chloride which precipitates removed by filtration. The filtrate is evaporated under reduced pressure leaving 26 parts of a residue which solidifies on standing. Distillation of this residue affords 20.7 parts of crude Compound IV (trans-diethyl-4-chloro-2-butenyl acetamidomalonate), boiling point 145° C. at 0.3 mm. Hg, as a distillate and also a nonvolatile residue.

The distillate is recrystallized from an ether-hexane mixture affording pure Compound IV, melting point 63.5°–64.0° C.

*Elemental analysis.*—Calculated for $C_{13}H_{20}ClNO_5$. Theory (percent): C, 51.07; H, 6.59; N, 4.58; Cl, 11.62. Found (percent): C, 51.62; H, 6.82; N, 4.57; Cl, 12.10.

The residue is triturated with ether affording 5.1 parts of Compound VII (trans-1,4-[diethylacetamidomalonyl]-butene-2).

*Elemental analysis.*—Calculated for $C_{22}H_{34}N_2O_{10}$. Theory (percent): C, 54.31; H, 7.04; N, 5.76. Found (percent): C, 53.94; H, 6.86; N, 5.72.

The structures of both of the above compounds are confirmed by infrared and nuclear magnetic resonance analyses.

EXAMPLE 2

Four parts of trans-diethyl - 4 - chloro-2-butenyl-acetamidomalonate, as prepared in Example 1, is placed in a pressure vessel containing 50 parts of anhydrous liquid ammonia. The mixture is allowed to stand for 12 hours and the pressure vessel then vented affording 4.2 parts of residue comprising a mixture of ammonium chloride and 4-amino-2-butenyl diethylacetamidomalonate. This residue is taken up in chloroform and the ammonium chloride, which is insoluble therein, removed by filtration. Evaporation of the chloroform at reduced pressure affords 3.6 parts of trans-4-amino-2-butenyl diethylacetamidomalonate.

Elemental, infrared and nuclear magnetic resonance analysis confirms the structure.

EXAMPLE 3

Ten parts of trans-4-amino-2-butenyl diethylacetamidomalonate and 0.5 part of 5% palladium on carbon is added to a Parr bomb containing 20 parts anhydrous ethanol. The bomb is sealed, purged of air, and pressurized to 100 p.s.i. with hydrogen. Heating to 60° C. with agitation results in reduction of the butenyl carbon-to-carbon double bond within 10 minutes. The vessel is then vented, the solution decanted from the catalyst, and 5 parts of concentrated hydrochloric acid added. The mixture is then refluxed for 1 hour, filtered and evaporated affording 8.3 parts of D,L-lysine hydrochloride.

EXAMPLE 4

Five parts of D,L-lysine hydrochloride, prepared as in Example 3, is dissolved in 20 parts of water, and then adsorbed on an alkaline ion exchange column. It is then eluted with aqueous acetic acid, and the eluted lysine solution evaporated to dryness affording pure D,L-lysine.

What is claimed is:

1. A process for the preparation of D,L-lysine comprising the steps of
   (a) reacting trans-1,4-dichlorobutene-2 with an alkali metal salt of diethylacetamidomalonate to afford a reaction mixture comprising trans-diethyl-4-chloro-2-butenyl acetamidomalonate,
   (b) recovering said trans-diethyl-4-chloro-2-butenyl acetamidomalonate,
   (c) amminating said trans-diethyl-4-chloro-2-butenyl acetamidomalonate, wih liquid ammonia to form a reaction mixture comprising trans-4-amino-2-butenyl diethylacetamidomalonate,
   (d) recovering said trans-4-amino-2-butenyl diethylacetamidomalonate,
   (e) hydrogenating the double bond, deesterifying and deaminating with concomitant decarboxylation by heating in an acid or basic medium, and neutralizing said trans-4-amino-2-butenyl diethylacetamidomalonate to afford D,L-lysine.

References Cited

UNITED STATES PATENTS

| | | | |
|---|---|---|---|
| 2,521,809 | 9/1950 | Tishler et al. | 260—482 |
| 2,995,601 | 8/1961 | Stange et al. | 260—534 |

FOREIGN PATENTS

| | | | |
|---|---|---|---|
| 875,354 | 8/1961 | Great Britain | 260—534 |

LORRAINE A. WEINBERGER, Primary Examiner

P. J. KILLOS, Assistant Examiner

U.S. Cl. X.R.

260—326 NS, 482 P